(12) United States Patent
Jensen et al.

(10) Patent No.: US 8,272,480 B2
(45) Date of Patent: Sep. 25, 2012

(54) OIL PAN INTEGRATED WITH FILTER AND OTHER COMPONENTS

(75) Inventors: Hans Jensen, Kirchheim (DE); Zhouxuan Xia, Windsor (CA); Ken Belanger, St. Clair Shores, MI (US)

(73) Assignee: Mahle International GmbH (DE)

( * ) Notice: Subject to any disclaimer, the term of this patent is extended or adjusted under 35 U.S.C. 154(b) by 407 days.

(21) Appl. No.: 12/402,870

(22) Filed: Mar. 12, 2009

(65) Prior Publication Data

US 2010/0230212 A1 Sep. 16, 2010

(51) Int. Cl.
*F01M 1/10* (2006.01)

(52) U.S. Cl. .................... 184/6.24; 123/196 A
(58) Field of Classification Search ............ 184/6.24, 184/6; 123/196
See application file for complete search history.

(56) References Cited

U.S. PATENT DOCUMENTS

| | | | |
|---|---|---|---|
| 3,707,202 A * | 12/1972 | Dixon ........................ | 184/6.24 |
| 5,814,215 A * | 9/1998 | Bruss et al. .................. | 210/130 |
| 5,857,442 A | 1/1999 | Sumi | |
| 5,934,241 A * | 8/1999 | Von Esebeck et al. ..... | 123/196 R |
| 6,058,898 A * | 5/2000 | Freese, V ................... | 123/195 C |
| 6,705,270 B1 * | 3/2004 | Rau et al. .................. | 123/195 C |
| 6,715,459 B2 * | 4/2004 | Rosendahl et al. ........ | 123/195 C |
| 7,318,405 B2 * | 1/2008 | Tanaka et al. ............. | 123/195 C |
| 2005/0072396 A1 * | 4/2005 | Lee .......................... | 123/196 R |
| 2010/0147253 A1 * | 6/2010 | Burke et al. ................ | 123/195 |
| 2010/0282203 A1 * | 11/2010 | Jessberger et al. ......... | 123/195 |

FOREIGN PATENT DOCUMENTS

| | | |
|---|---|---|
| DE | 19746704 A1 | 5/1998 |
| DE | 102006032795 A1 | 1/2008 |
| DE | 102007040666 A1 | 3/2009 |
| EP | 1878884 A2 | 1/2008 |
| JP | 63-131812 A | 6/1988 |

OTHER PUBLICATIONS

English abstract for JP-63-121812.
European Search Report for EP10155923.

* cited by examiner

*Primary Examiner* — Michael Mansen
*Assistant Examiner* — Michael Riegelman
(74) *Attorney, Agent, or Firm* — Rader, Fishman & Grauer PLLC

(57) ABSTRACT

An oil pan assembly is disclosed that includes an oil filter, and an oil pan receiving the filter. The oil pan includes a reservoir defining a drain aperture for selectively draining fluid out of the oil pan, and a wall defining a filter cavity in fluid communication with a receiving passage and a sending passage of the oil pan. The oil pan further includes a filter cover assembly, including a cover securing the oil filter within the filter cavity, a filter drain tube extending from the cover through the filter cavity and into a drain passage, and a plug disposed on the filter drain tube, the plug selectively sealing the drain passage. The drain passage allows fluid communication between the filter cavity and the reservoir. The filter drain tube is configured to receive filtered oil from the oil filter.

20 Claims, 3 Drawing Sheets

OIL PAN INTEGRATED WITH FILTER AND OTHER COMPONENTS

BACKGROUND

Crankcases of internal combustion engines are typically lubricated with motor oils or other lubricants. The oil is often maintained in a reservoir beneath the engine that allows selective access to the reservoir, e.g., to allow draining or replacement of oil or lubricant. As motor oils become contaminated with dirt, moisture, or other particles that would otherwise interfere with engine operation, it is necessary to filter the oil during engine operation.

Oil filters are commonly assembled to an oil pan in which the oil reservoir is maintained. The oil filters generally prolong engine life by screening contaminants from the oil, but it is still necessary to periodically drain the oil from the engine and replace it with fresh oil. Further, the filters themselves also need to be periodically replaced as they too become clogged with contaminants.

The process of draining an engine oil pan or crankcase often requires draining the oil pan, and then removing the oil filter after oil has substantially drained from the pan. Unfortunately, some oil nearly always remains within the filter and immediately surrounding areas, occasionally resulting in spills of the remaining oil when the filter is removed.

Accordingly, there is a need for an oil pan assembly that allows for simplified maintenance of an engine oil supply.

BRIEF DESCRIPTION OF THE DRAWINGS

While the claims are not limited to the illustrated embodiments, an appreciation of various aspects is best gained through a discussion of various examples thereof. Referring now to the drawings, illustrative embodiments are shown in detail. Although the drawings represent the embodiments, the drawings are not necessarily to scale and certain features may be exaggerated to better illustrate and explain an innovative aspect of an embodiment. Further, the embodiments described herein are not intended to be exhaustive or otherwise limiting or restricting to the precise form and configuration shown in the drawings and disclosed in the following detailed description. Exemplary embodiments of the present invention are described in detail by referring to the drawings as follows:

DETAILED DESCRIPTION

Reference in the specification to "an exemplary illustration", and "example" or similar language means that a particular feature, structure, or characteristic described in connection with the exemplary approach is included in at least one illustration. The appearances of the phrase "in an illustration" or similar type language in various places in the specification are not necessarily all referring to the same illustration or example.

According to various exemplary illustrations, an oil pan assembly is described that includes an oil filter, and an oil pan receiving the filter. The oil pan includes a reservoir defining a drain aperture for selectively draining fluid out of the oil pan, and a wall defining a filter cavity in fluid communication with a receiving passage and a sending passage of the oil pan. The receiving passage allows fluid communication from the reservoir to the filter cavity, and the sending passage allows fluid communication from the filter cavity to the reservoir. The oil pan further includes a filter cover assembly, including a cover securing the oil filter within the filter cavity, a filter drain tube extending from the cover through the filter cavity and into a drain passage, and a plug disposed on the filter drain tube, the plug selectively sealing the drain passage. The drain passage allows fluid communication between the filter cavity and the reservoir. The filter drain tube is configured to receive filtered oil from the oil filter.

The oil pan assembly generally allows for an oil filter to be positioned in the oil pan in an inverted position wherein oil drains from the filter directly into the pan, where it may be further drained from the oil pan. The oil pan assembly thereby allows for simplified draining of the filter and oil pan, and minimizes spills that may otherwise occur during removal of the filter from the oil pan.

Figure 1A:
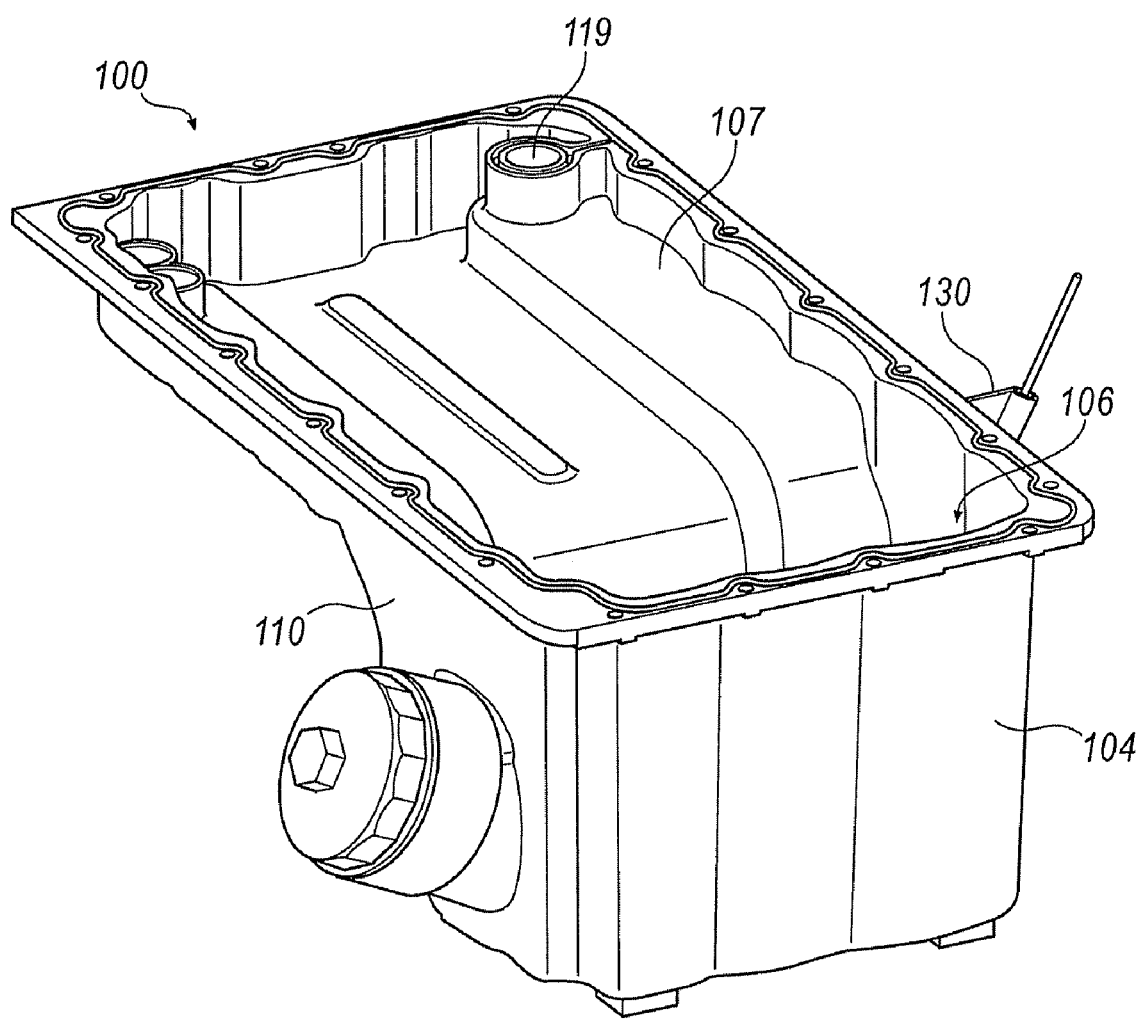
FIG. 1A is a perspective view of an exemplary oil pan assembly.
Figure 1B:
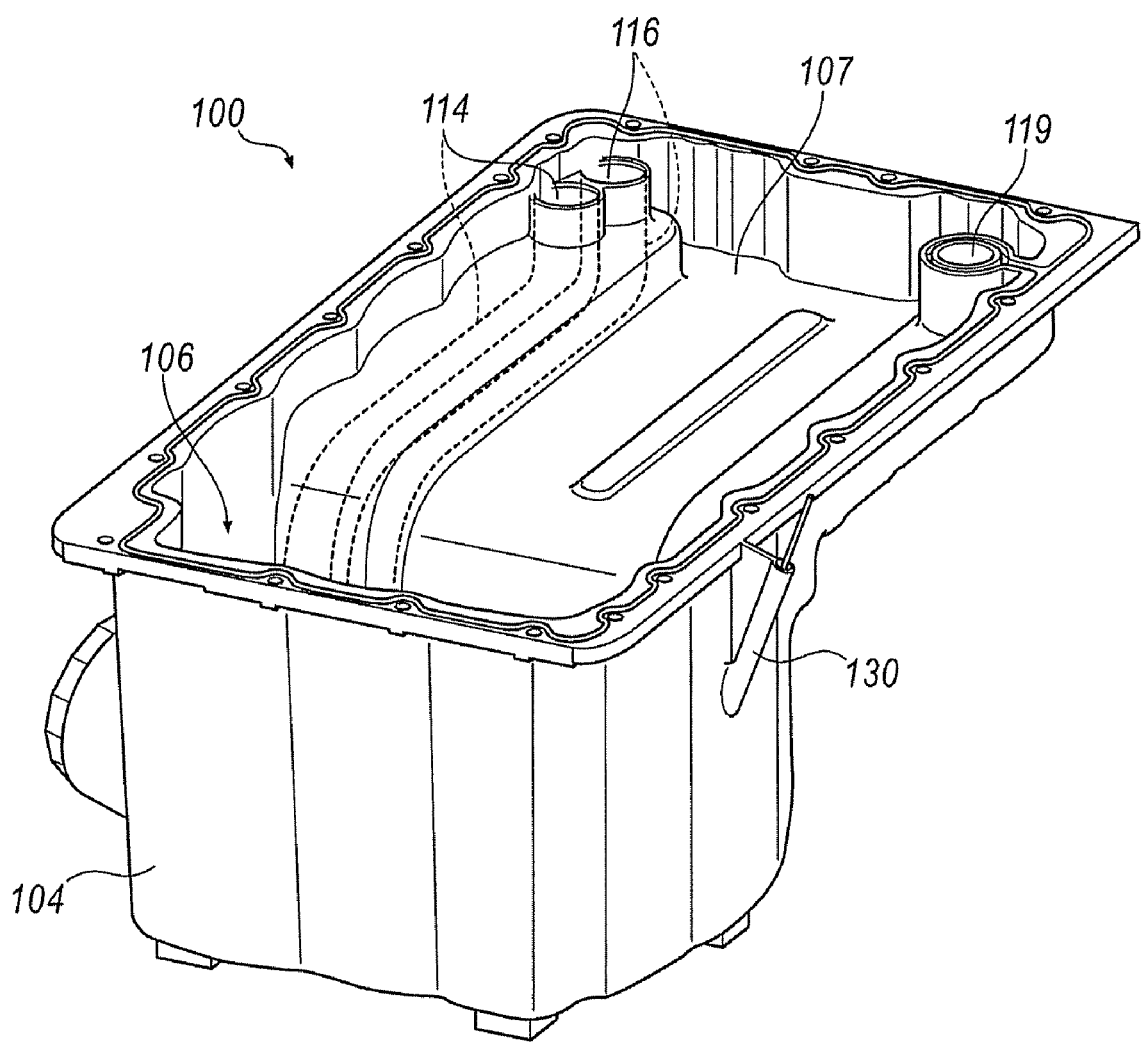
FIG. 1B is another perspective view of an exemplary oil pan assembly.

Turning now to FIGS. 1A and 1B, an oil pan assembly 100 is shown. Oil pan assembly 100 includes an oil filter 102 and an oil pan 104 receiving the filter 102. The oil pan 104 generally includes a reservoir 106 and an upper pan 107. Reservoir 106 is generally a main reservoir of the oil pan 104 where oil or other lubricants are retained for lubricating an engine crank case (not shown). The upper pan 107 is generally configured to allow any oil or other lubricants to remain in the main reservoir 106. Oil or other lubricants are preferably pumped into the engine crankcase from a lower portion of the main reservoir 106. As will be described further below, upper pan 107 includes passages for pumping oil from the reservoir 106 to the oil filter 102, and vice versa, as part of the oil filtering function provided by the oil pan 104.

Figure 2:
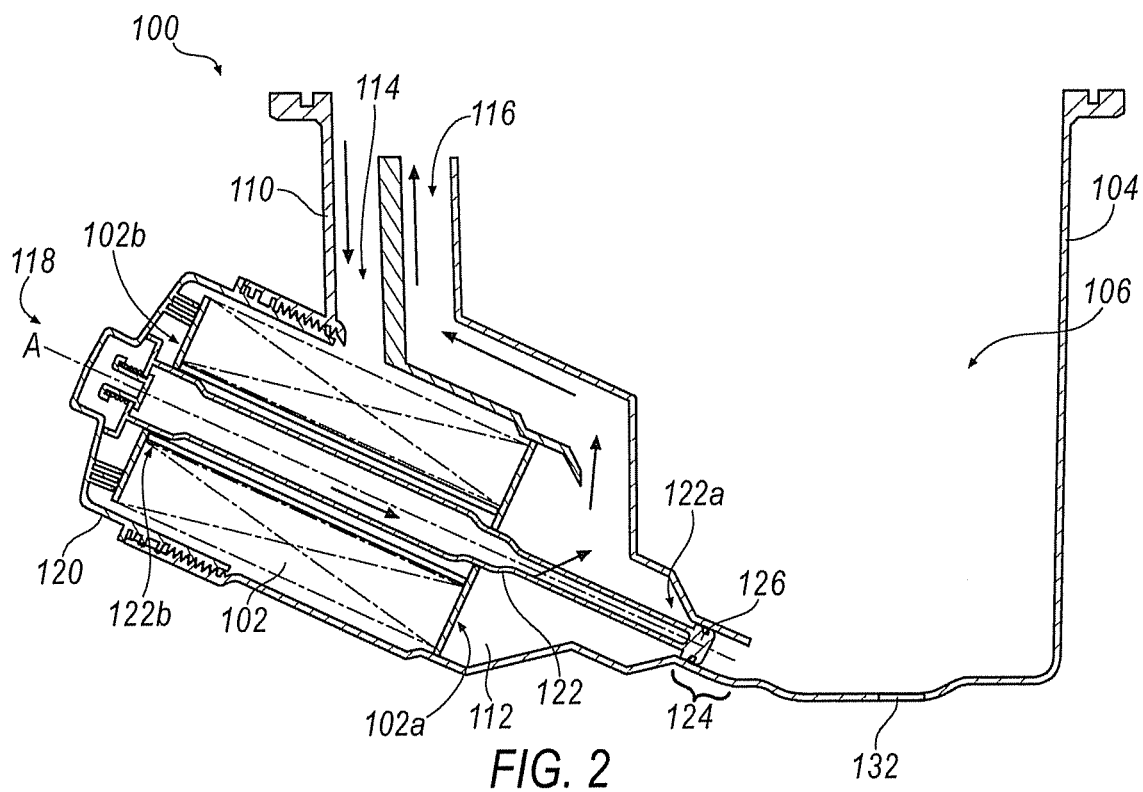
FIG. 2 is a section view of the exemplary oil pan assembly of FIGS. 1A and 1B.

Turning now to FIG. 2, the oil pan 104 includes a wall 110 that defines, in part, a filter cavity 112. Filter cavity 112 is in fluid communication with a receiving passage 114 and a sending passage 116 of the oil pan 104. The receiving passage 114, as best seen in FIG. 2, may be generally used to distribute oil from the reservoir 106 to the filter 102, i.e., for generally filtering the oil. The sending passage 116 may be generally used to send filtered oil from the filter cavity 112 back to the reservoir 106. In other words, the receiving passage 114 generally allows fluid communication from the reservoir 106 to the filter cavity 112. Conversely, the sending passage 116 generally allows fluid communication from the filter cavity 112 back to the reservoir 106. The receiving passage thus may selectively communicate fluid, e.g., by pumping, from the reservoir 106 to a filter intake of the oil filter 102 when the oil filter 102 is secured within the filter cavity 112. The sending passage 116, conversely, selectively communicates fluid, e.g., by pumping, from the filter cavity 112 back to the reservoir 106. One or more pumps (not shown) may be provided to pump oil or other lubricants from the reservoir 106 to the filter 102, from the filter 102 into the filter cavity 112, and from the filter cavity 112 back to the reservoir 106, as generally indicated by the arrows in FIG. 2. Oil from the reservoir 106 is generally circulated throughout an engine oil gallery for lubricating internal parts of the engine. The sending passage 116 thus allows for selectively communicating fluid from a filtered fluid exhaust of the oil filter 102 when the oil filter 102 is secured in filter cavity 112. The sending passage 116 thereby provides filtered oil to the reservoir for circulation about the engine, e.g., via an engine oil communication passage 119. After circulation through the engine, oil may be returned to the reservoir 106 for filtering. Oil from the reservoir 106 may be pumped through filter 102 via receiving passage 114. A pump (not shown) may be provided in reservoir 106 for circulating engine oil throughout the oil pan assembly 100 and/or an associated engine. Further, temperature and/or pressure sensors may be provided in the oil pan 104 for generally monitoring oil temperature and pressure. As best seen FIGS. 1A, 1B, and 3, the sending and receiving passages 116, 114 are each defined in part by an upper passage half 117a that is secured to a lower passage half 117b, as will be described further below.

As best seen in FIG. 2, a filter cover assembly 118 generally retains the oil filter 102 within the filter cavity 112. The filter cover assembly 118 may generally include a cover 120 securing the oil filter 102 within the filter cavity 112. The filter cover assembly 118 further includes a filter drain tube 122 that extends from the cover 120 through the filter cavity 112 and into a drain passage 124 defined by the oil pan 104.

The filter drain tube 122 may generally have an axis A that extends from the cover 120 through the filter cavity 112, and into the drain passage 124. The drain passage 124 allows fluid communication between the filter cavity 112 and the reservoir 106. The filter drain tube 122 is generally configured to receive filtered oil from the oil filter 102. For example, oil filter 102 may generally receive oil from an oil pump (not shown) that pumps oil from the reservoir 106 to the oil filter 102, with the filter receiving the oil at a radially outermost surface of the oil filter 102, e.g., adjacent receiving passage 114. The oil may generally flow through the oil filter 102 toward a radially central portion of the filter 102 adjacent the filter drain tube 122 and/or axis A. The filter drain tube 122 may be screened or otherwise provided with apertures for receiving filtered oil from the oil filter 102. The filtered oil may then generally flow down the filter drain tube 122 towards an end of the filter drain tube 122 generally opposite the cover 120. Filtered oil may then be emptied from the filter drain tube, e.g., through one or more apertures in the filter drain tube 122, and into the filtered cavity 112. The filtered oil may then be pumped away from the filter 102 via sending passage 116, with the oil being pumped back to the desired areas of the engine. Oil may thus be continuously circulated through the engine, eventually returning to the reservoir 106 for filtering.

The filter drain tube 122 may be provided with a plug 126 that selectively seals the drain passage 124. During operation of an engine (not shown) to which the oil pan assembly 100 is secured, the plug 126 seals the drain passage 124 such that the plug 126 generally prevents fluid communication through the drain passage 124. Thus, the plug 126 may be positioned within the drain passage 124 when the filter cover assembly 118 secures the filter 102 to the oil pan 104. Further, the plug 126 is generally removed from the drain passage 124 when the filter cover assembly 118 is removed from the oil pan 104. Fluid communication is thus allowed between the filtered cavity 112 and the reservoir 106 via drain passage 124 when the plug 126 is removed. Accordingly, the plug 126 selectively seals the drain passage 124 according to whether the filter cover assembly 118 is secured to the oil pan 104. When it is desired to change the engine oil and/or filter 102, the cover 120 may be threaded away from the filter 102, and the plug 126 displaced from the drain passage 124, such that oil is allowed to flow into the reservoir 106.

The filter cover assembly 118 may be threaded, e.g. on the cover 120, and may further engage complimentary threads on the oil pan 104 to allow for selective securement of the filter cover assembly 118 and/or the oil filter 102 to the oil pan 104. The filter cover assembly 118 may be loosened or removed from the oil pan 104 when it is desired to drain oil or lubricants from the oil pan 104. Generally, the cover 120 may be loosened, allowing the filter cover assembly 118, and in particular the filter drain tube 122, to be moved away from drain passage 124 along axis A. Accordingly, the plug 126 is loosened or removed from the drain passage 124, allowing any oil remaining in the filter cavity 112 to flow through the drain passage 124 and into reservoir 106.

The reservoir 106, in turn, includes a drain aperture 132 that allows selective draining of fluid out of the oil pan 104. The drain aperture 132 may be selectively blocked with a drain plug (not shown) that may be removed for draining the oil pan 104. As shown in FIG. 2, the drain aperture 132 may be positioned relative to the drain passage 124 such that oil or other fluids generally flow downward from the drain passage 124 to the drain aperture 132. For example, the drain aperture 132 may be positioned generally lower than the drain passage 124, such that gravity may cause oil or other fluids to flow from the drain passage 124 to the drain aperture 132. Further, the drain aperture 132 may be positioned relative to the reservoir 106, such that substantially all fluid contained within the filter 102 and the reservoir 106 are drained out of the oil pan when the drain passage 124 and the drain aperture 132 are opened.

As shown in FIG. 2, the plug 126 is disposed at a first end 122a of the filter drain tube 122, while the cover 120 is secured to a second end 122b of the filter drain tube 122 that is generally opposite the first end 122a. The cover 120 thus retains the oil filter 102 within the filter cavity 112 such that filtered oil exits the oil filter 102 out of a lower most end 102a of the filter 102 and into the filter cavity 112. Further, the cover 120 engages a first end 102b of the oil filter 102 when it secures the oil filter 102 within the filter cavity 112. The filtered oil thus exits the oil filter 102 out of the opposite filter end 102a via the filter drain tube 122.

The oil pan 104 may be integrally formed including, for example, the reservoir 106, the filter cavity 112, and the drain passage 124. For example, the oil pan 104 may be formed of an injection molded material, e.g. a plastic material, including the reservoir 106, the filter cavity 112 and the drain passage 124.

The oil pan 104, as best seen in FIGS. 1A and 1B, may also include a dip stick passage 130 that is adjacent the reservoir 106. The dip stick passage 130 may generally extend into the reservoir 106, thereby allowing selective insertion and removal of a dip stick for generally checking a level of oil or other lubricants contained within the reservoir 106. The dip stick passage 130 may be formed integrally with the rest of the oil pan 104.

Figure 3:
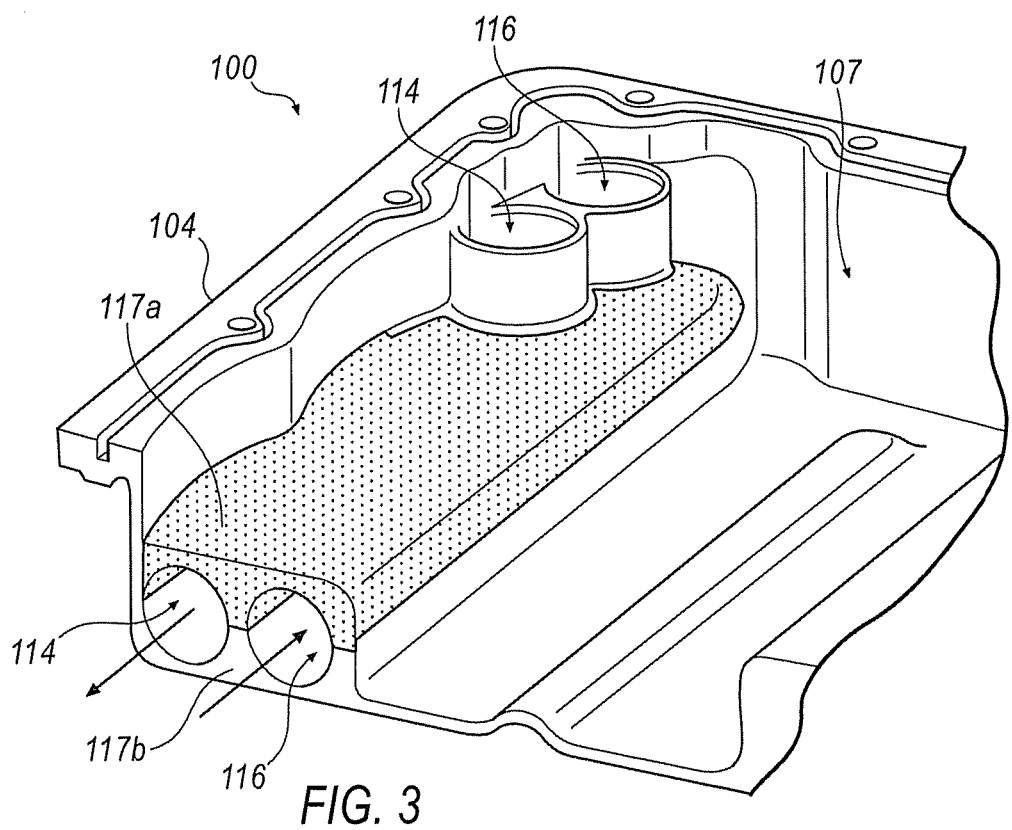
FIG. 3 is an enlarged perspective view of an upper pan portion of the exemplar oil pan assembly shown in FIGS. 1A and 1B.

As described above, many of the components of the oil pan 104 may be generally integrally formed. Additionally, each of the sending and receiving passages 114, 116 may be partially formed within a portion of the oil pan 104 along the upper pan 107, as best seen in FIG. 3. An upper passage block 117a of the sending and receiving passages 116, 114 may be secured to a lower passage block 117b that is formed integrally as part of the oil pan 104, e.g., as part of upper pan 107. Accordingly, the upper and lower passage blocks 117a, 117b cooperate to define the sending and receiving passages 116, 114. The upper passage block 117a may be formed by any process that is convenient, e.g., an injection molding process using a similar material as the oil pan 104 and/or lower passage half 117b. Further, the upper passage block 117a may be secured to the lower passage block 117b by any method that is convenient, e.g., a vibration welding process. Alternatively, the passages 114, 116 may be formed integrally within the oil pan 104, or may be formed separately, e.g., by blow molding, water separation forming, or the like, as tubular passages that are subsequently secured to the oil pan 104. The oil pan 104 may also include temperature and/or pressure sensors (not shown) integrated into the oil pan 104, e.g., adjacent or within the passages 114, 116.

Accordingly, the oil pan 104 generally provides for a generally integral or one-piece construction. Further, the oil pan 104 selectively secures the oil filter 102 in an inverted position that allows draining of the filter 102 directly into the oil pan 104. Accordingly, oil may be drained from the filter 102 and oil pan 104 via the drain aperture 132. Once the cover 120 is loosened from the oil pan 104 and the plug 126 is loosened or removed from the drain passage 124, any oil remaining in the filter cavity 112 will be allowed to flow into the reservoir 106. Thus, to drain the entire oil pan assembly including the reservoir 106, upper pan 107, and filter cavity 112, the drain aperture 132 may be opened, e.g., by removing a plug (not shown), and the filter cover assembly 118 may be loosened sufficiently to loosen or remove the plug 126 from the drain passage 124. Oil from the filter 102 thus may flow downward into the filter cavity 112, through the drain passage 124, and into the main reservoir 106 where it may flow out of the oil pan 104 via the drain aperture 132 along with any oil contained in the main reservoir 106 and upper pan 107. After substantially all oil has been drained from the filter 102 and oil pan 104, the filter cover assembly 118 may be removed and the filter 102 disposed of or replaced. The oil pan assembly thus provides for a simplified draining of the oil pan 104 and reduced need to clean up spills that may otherwise be difficult to prevent when removing an oil filter from an oil pan.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain approaches, examples or embodiments, and should in no way be construed so as to limit the claimed invention.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their broadest reasonable constructions and their ordinary meanings as understood by those skilled in the art unless an explicit indication to the contrary is made herein. In particular, use of the singular articles such as "a," "the," "said," etc. should be read to recite one or more of the indicated elements unless a claim recites an explicit limitation to the contrary.

What is claimed is:

1. An oil pan, comprising:
    a lower pan having a reservoir defining a drain aperture for selectively draining fluid out of the oil pan;
    an upper pan configured to allow a lubricant to remain in the reservoir of the lower pan;
    a wall having an outer surface defining in part an exterior of the oil pan, the wall having an inner surface defining a filter cavity in fluid communication with a receiving passage and a sending passage of the oil pan, the wall extending from the lower pan to the upper pan and defining at least in part the receiving passage and the sending passage such that the receiving passage and sending passage extend within the wall and are defined between the outer and inner surfaces from the upper pan to the filter cavity, said receiving passage allowing fluid communication from said reservoir to said filter cavity, said sending passage allowing fluid communication from said filter cavity to said reservoir; and
    a filter cover assembly, including:
        a cover configured to selectively secure an oil filter within said filter cavity;
        a filter drain tube extending from said cover through the filter cavity and into a drain passage, said drain passage allowing fluid communication between said filter cavity and said reservoir, said filter drain tube configured to receive filtered oil from the filter; and
        a plug disposed on said filter drain tube, said plug selectively sealing said drain passage.

2. The oil pan of claim 1, wherein said plug selectively seals said drain passage such that said plug generally prevents fluid communication through said drain passage when said filter cover assembly is secured to the oil pan, and said plug generally allows fluid communication through said drain passage such that fluid within said filter cavity drains through said drain passage and into said reservoir when said filter cover assembly is removed from the oil pan.

3. The oil pan of claim 1, wherein said drain aperture is lower than said drain passage, and said drain aperture is in a lowermost portion of said reservoir, such that substantially all of a fluid contained within said filter cavity and said reservoir is drained out of the oil pan when said drain passage and said drain aperture are open.

4. The oil pan of claim 1, wherein said plug is disposed at a first end of said filter drain tube, and said cover is secured to a second end of said filter drain tube, said first end disposed generally opposite said second end.

5. The oil pan of claim 1, wherein said cover retains the oil filter within said filter cavity such that oil exits the filter out of a lowermost end of the filter into said filter cavity.

6. The oil pan of claim 1, wherein said receiving passage selectively communicates fluid from said reservoir to a filter intake of the oil filter when the oil filter is secured in said filter cavity.

7. The oil pan of claim 1, wherein said sending passage includes an exit orifice disposed in the upper pan such that said sending passage selectively communicates fluid from a filtered fluid exhaust of the oil filter directly to the upper pan when the oil filter is secured in said filter cavity.

8. The oil pan of claim 7, further comprising an engine oil communication passage defined by the oil pan, said engine oil communication passage defined separately and spaced away from said sending passage such that the engine oil communication passage selectively communicates oil from the lower pan to an engine oil communication passage orifice defined in the upper pan.

9. The oil pan of claim 1, wherein the oil pan is integrally formed, including at least said reservoir, said filter cavity, and said drain passage.

10. The oil pan of claim 9, wherein the oil pan is formed of an injection-molded material, including at least said reservoir, said filter cavity, and said drain passage.

11. The oil pan of claim 9, further comprising a dipstick passage adjacent said reservoir, said dipstick cavity extending into said reservoir, said dipstick passage formed integrally with the oil pan.

12. An oil pan assembly, comprising:
an oil filter; and
an oil pan receiving said filter, including:
a lower pan having a reservoir defining a drain aperture for selectively draining fluid out of the oil pan;
an upper pan configured to allow a lubricant to remain in the reservoir of the lower pan;
a wall having an outer surface defining in part an exterior of the oil pan, the wall having an inner surface defining a filter cavity in fluid communication with a receiving passage and a sending passage of the oil pan, the wall extending from the lower pan to the upper pan and defining at least in part the receiving passage and the sending passage such that the receiving passage and sending passage extend within the wall and are defined between the outer and inner surfaces from the upper pan to the filter cavity, said receiving passage allowing fluid communication from said reservoir to said filter cavity, said sending passage allowing fluid communication from said filter cavity to said reservoir; and
a filter cover assembly, including:
a cover securing said oil filter within said filter cavity;
a filter drain tube extending from said cover through said filter cavity and into a drain passage, said drain passage allowing fluid communication between said filter cavity and said reservoir, said filter drain tube configured to receive filtered oil from said oil filter; and
a plug disposed on said filter drain tube, said plug selectively sealing said drain passage.

13. The oil pan assembly of claim 12, wherein said plug selectively seals said drain passage such that said plug generally prevents fluid communication through said drain passage when said filter cover assembly secures said filter to the oil pan, and said plug generally allows fluid communication through said drain passage such that fluid within said filter cavity drains through said drain passage and into said reservoir when said filter cover assembly is removed from the oil pan.

14. The oil pan assembly of claim 12, wherein said drain aperture is lower than said drain passage, and said drain aperture is in a lowermost portion of said reservoir, such that substantially all of a fluid contained within said filter cavity and said reservoir is drained out of the oil pan when said drain passage and said drain aperture are open.

15. The oil pan assembly of claim 12, wherein said plug is disposed at a first end of said filter drain tube, and said cover is secured to a second end of said filter drain tube, said first end disposed generally opposite said second end.

16. The oil pan assembly of claim 12, wherein said cover retains said oil filter within said filter cavity such that oil exits said oil filter out of a lowermost end of said oil filter into said filter cavity.

17. The oil pan assembly of claim 12, wherein said cover engages a first end of said oil filter, thereby securing said oil filter within said filter cavity such that filtered oil exits said oil filter out of an end opposite the first end of said oil filter into said tube portion.

18. The oil pan assembly of claim 12, wherein said oil pan is integrally formed, including at least said reservoir, said filter cavity, and said drain passage.

19. The oil pan assembly of claim 18, wherein said oil pan is formed of an injection-molded material, including at least said reservoir, said filter cavity, and said drain passage.

20. An oil pan assembly, comprising:
an oil filter; and
an oil pan receiving said filter, including:
a lower pan having a reservoir defining a drain aperture for selectively draining fluid out of the oil pan;
an upper pan configured to allow a lubricant to remain in the reservoir of the lower pan;
a wall having an outer surface defining in part an exterior of the oil pan, the wall having an inner surface defining a filter cavity in fluid communication with a receiving passage and a sending passage of the oil pan, the wall extending from the lower pan to the upper pan and defining at least in part the receiving passage and the sending passage such that the receiving passage and sending passage extend within the wall and are defined between the outer and inner surfaces from the upper pan to the filter cavity, said receiving passage allowing fluid communication from said reservoir to said filter cavity, said sending passage allowing fluid communication from said filter cavity to said reservoir; and
a filter cover assembly, including:
a cover securing said oil filter within said filter cavity such that oil exits said oil filter out of a lowermost end of said filter into said filter cavity;
a filter drain tube extending from a first end adjacent said cover, said filter drain tube extending through said filter cavity and into a drain passage, said drain passage allowing fluid communication between said filter cavity and said reservoir, said filter drain tube configured to receive filtered oil from said oil filter; and
a plug disposed at a second end of said filter drain tube, said second end disposed generally opposite said first end, said plug selectively sealing said drain passage such that said plug generally prevents fluid communication through said drain passage when said filter cover assembly secures said filter to the oil pan, and said plug generally allows fluid communication through said drain passage such that fluid within said filter cavity drains through said drain passage and into said reservoir when said filter cover assembly is removed from the oil pan;
wherein said drain aperture is lower than said drain passage, and said drain aperture is in a lowermost portion of said reservoir, such that substantially all of a fluid contained within said filter cavity and said reservoir is drained out of the oil pan when said drain passage and said drain aperture are open; and
wherein said oil pan is integrally formed of an injection-molded material, including at least said reservoir, said filter cavity, and said drain passage.

* * * * *